Aug. 21, 1951  R. L. CROUSE  2,564,676

LIQUID LEVEL INDICATOR

Filed July 3, 1946

INVENTOR.
ROBERT L. CROUSE
BY M. A. Hayes
Attorney

Patented Aug. 21, 1951

2,564,676

UNITED STATES PATENT OFFICE 2,564,676

LIQUID LEVEL INDICATOR

Robert L. Crouse, Winterset, Iowa

Application July 3, 1946, Serial No. 681,270

7 Claims. (Cl. 73—320)

(Granted under the act of March 3, 1883, as amended April 30, 1928; 370 O. G. 757)

This invention relates to liquid-level gauges and more particularly to gauges of the float type in which the indicating means for recording the liquid level is magnetically actuated.

In the past, various forms of magnetic indicators have been attached to fluid tanks or containers which employ the force of a magnetic field for the indication of liquid level by means of rotative magnetic elements. An important characteristic of these liquid-level indicators is that they are adapted to prevent the leakage of liquids and gases from the tank around the gauge. In accomplishing the desired results it has been the practice to mount rotatively a single bar magnet within the gauge so that it is responsive to the movement of a float member movable with changes in liquid level. A second bar magnet or pointer is disposed externally of the top of the gauge in parallel relation with the single or first bar magnet. Thus, as the internal bar magnet rotates, so does the externally mounted magnet or pointer being driven by the movement or rotation of the magnetic flux. Although this arrangement of the indicator needle or magnet in relation to the driving member within the gauge is satisfactory for most indicating purposes, it is often desirable to have the indicator pointer or magnet mounted at an angle to facilitate reading of its position on a suitable dial or disc marked to correspond with the liquid level within the fluid container. In the prior art structures the mounting of the indicator member in an angular position necessitates, however, a complex mechanism.

A primary object of the invention is to eliminate the above-mentioned difficulty by providing an improved transmission mechanism so arranged that the indicator may be read from several positions, if desired.

A further object is to arrange the various components of the gauge in such manner that they may be readily assembled and disassembled to allow inspection, adjustment and repair.

Still another object of this invention is to afford an improved manner of mounting an indicator for this type of liquid-level gauge which is both efficient and simple in construction.

It is also contemplated that the gauge be compact in construction and usable in standard or existing facilities with a minimum of alteration necessary for installation.

In its broadest sense, this invention embodies a liquid level gauge having a float member responsive to changes in liquid level within a fluid tank or container. Magnetic transmission means are provided for transmitting movements of a float to an indicator mechanism.

More specifically, and in accordance with the preferred form of the invention, the transmission means comprises essentially a magnetic disc having two diametrically opposed peripheral points of opposite polarity. Furthermore, the magnetic member as first mentioned is in the form of a bar magnet or magnetic disc in responsive relation with the float. The indicator disc is so mounted externally of the gauge that its axis is adjustable from right angular to parallel relation with the axis of the magnetic member attached by rotative means to the float, thus enabling the indicator disc to be selectively placed in the most desirable reading position. Also, in order that the fluid-tight seal may be maintained between the elements within the gauge and those mounted externally of the fluid tank, a non-magnetic plate or member is interposed between the two magnetic members. In the more usual form of construction, a cylindrical tube contains a float which is responsive to changes in liquid level. As the float rises or falls it also rotates horizontally, thereby giving rotational movement to the magnetic member or disc within the gauge. A spiral or helical guide is inserted and frictionally held within the tube to impart controlled rotational movement to the float, said float being in sliding relation with the guide.

An alternate form of indicator construction utilized in the practice of this invention consists of mounting a bar magnet for linear movement by the float and associating with the magnet a magnetic disc supported for rotational movement in a plane normal to the axis of movement of the bar magnet.

The driven magnetic disc as used in either the preferred or in the alternate form of the invention may be graduated to indicate liquid levels directly or may be connected to actuate remote indicating devices.

The invention is now described in detail with reference to the accompanying drawing in which.

Figure 1:
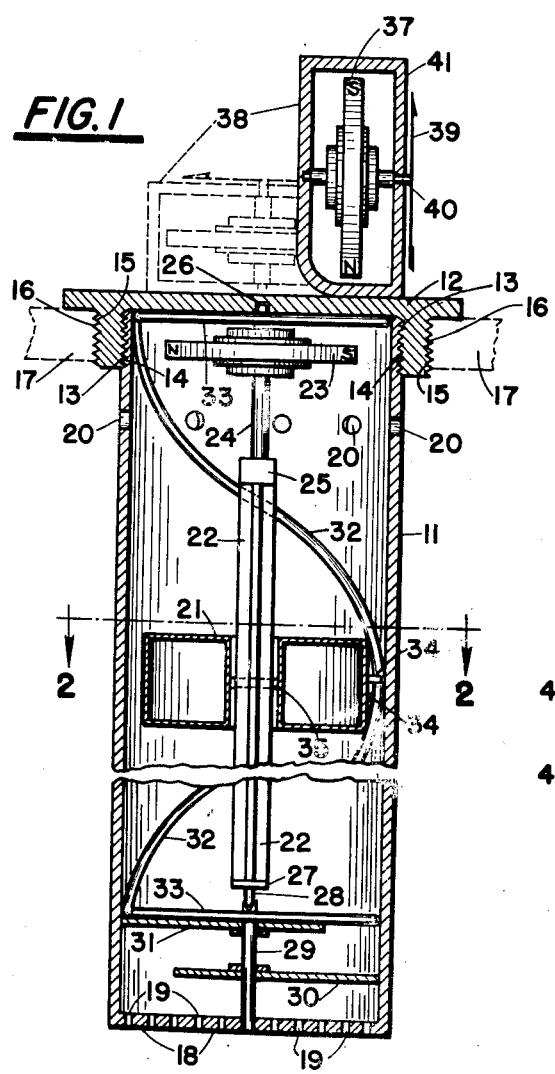
Figure 1 is a longitudinal sectional view of the preferred form of the invention in which the indicator means are shown as having two magnetic discs in angularly disposed relation.

As shown in Figure 1 of the drawing, the preferred form of the invention embodies generally a cylindrical tube 11. The upper end of this tube is closed by a non-magnetic cap or cover 12 having a fluid-tight sealing connection which is accomplished by providing threads 13 on the inside of the cap for engagement with suitable threads 14 on the outside surface of the tube end. Although this cap may be permanently secured to the end of the tube by welding or brazing, it is desirable to use threaded means to facilitate ready access to the interior of the tube.

The cap is also provided exteriorly with threads 15 for engaging threads 16 in order that both the tube and the cap may be removably secured in a wall of an associated tank 17. In this manner, the entire liquid-level gauge assembly may be removed from the tank by merely unscrewing the cap. The bottom 18 of the cylindrical tube 11 is perforated by holes 19 to permit the flow of liquid from the tank into the gauge. A plurality of holes 20, located around the tube at its upper end near the threads 14 provide air-relief vents for preventing back pressure from influencing the buoyancy of the float 21 within the tube.

A shaft 22 is located centrally and longitudinally within the tube and forms the transmission mechanism of horizontal rotational movement from the float to a magnetic disc 23 securely mounted on shaft 24. The lower end of this shaft is attached to a cap 25 mounted at the upper end of the central shaft 22. The upper end of shaft 24 is journaled in a bearing 26 on the interior of the cap 12. A base plate 27, similar to the cap 25, is secured at the bottom of the central shaft and carries a smaller shaft 28 having pivotal engagement with an upwardly projecting stud 29 centrally secured of the bottom 18.

Baffle plates 30 and 31 are mounted in staggered relation to each other and in parallelism with the bottom 18 for retarding the flow of liquid from outside the tube 11 through the holes 19 into the central portion or interior chamber defined by the walls of the tube. Although the retarding action of the baffle plate 30 and 31 is not absolutely essential to efficient operation, it is a desirable feature of this type of gauge, since small or sudden changes due to rocking of the tank are not immediately registered by a corresponding movement of the float member 21.

The float 21, upon which the ultimate operation of the indicator depends, comprises a hollow, metallic ring having a rectangular cross-section. The material and design of the float may be varied as desired, since the only essential characteristics are that the float be buoyant and in slidable and non-rotatable relation with the central shaft 22.

Figure 2:
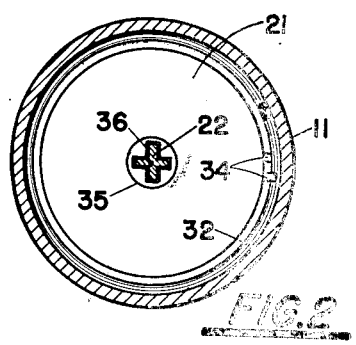
Figure 2 is a transverse sectional view taken substantially on line 2—2 of Figure 1.

An additional component in this type of fluid gauge is the helical guide 32 frictionally held within the tube 11 and confined longitudinally by the upper baffle plate 31 and the inner surface of the cap 12. Loops 33 are respectively provided at the ends of the guide to aid in maintaining it in proper operative position within the gauge. The purpose of the helical guide is to control the rotational movement of the float in response to changes in liquid level within the tank. Two small projections 34 are secured to the outer circumferential surface of the float and positioned to slidably engage the helical guide in order that the float may be forced to rotate as it moves along the central shaft 22. As shown in Figure 2, the float is maintained in slidable but non-rotatable relation with the shaft by means of a disc or plate member 35 which is provided with a suitable opening 36 through which the shaft 22 of cruciform cross section slidably passes. The disc 35 is secured to the inner circumferential surface of the ring or float. A particular advantage of this type of helical guide is its simplicity of construction and its adaptability to assembly and disassembly of the gauge. In other types of liquid-level gauges employing a rotatable float member, the float has been guided by a helical slot or opening in the wall of the tube. Under usual conditions of operation, the prior art method of rotating the float member is satisfactory, but where the retarding of the flow of liquid from the tank into the gauge is advantageous, an opening through the wall defeats the purpose of the holes 19 and the baffle plates 30 and 31. The frictionally held type of guide, as described, is therefore preferred.

In the operation of the gauge, for example, as the liquid level rises within the cylindrical tube, the float member rises along the shaft 22 and rotates in a counter-clockwise direction, when viewed from above. The magnetic disc 23 also rotates in a counter-clockwise direction being secured to the assembly comprising shaft 24, cap 25 and central shaft 22. Conversely, the magnetic disc rotates in a clockwise direction as the liquid level drops within the tube.

Referring again to Figure 1, the indicator disc 37 is mounted externally of both the liquid level gauge and the tank and in adjustable relation with the magnetic disc within the gauge. The disc 37 is also mounted within a non-magnetic housing 38 which may be moved to the position from which the indicator pointer 39 is to be observed when mounted with the axis thereof horizontal as shown. For example, the magnetic disc 37 is axially secured to shaft 40 and the plane of rotation of the disc is substantially at right angles to the rotational plane of disc 23. The housing 38 may be adjusted to a position wherein the planes of rotation of the two magnetic discs 37 and 23 are in parallelism. Intermediate positions between the two shown, however, may be selected as desired. As indicated diagrammatically, the two discs are in proper magnetic relationship; that is, with the opposite poles, N and S, attracting each other. In operation, for example, as the driving disc 23 rotates in a counter-clockwise direction with a rise in liquid level within the tube, the exteriorly mounted magnetic disc 37 will follow in proper ratio, also in a counter-clockwise direction. This movement, which represents the liquid level within the fluid gauge, will in turn be indicated on the face of the non-magnetic housing 38 by a changed position of indicator pointer 39.

Figure 3:
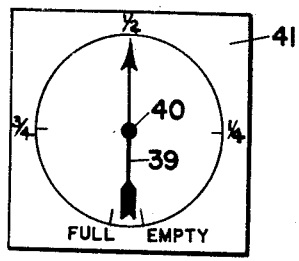
Figure 3 is a partial view showing the indicator dial of Figure 1 as seen in elevation.

Figure 3 illustrates the face 41 of the non-magnetic housing 38 graduated to indicate the liquid levels within the gauge. It is apparent that the indicator gauge is so constructed that one revolution of the indicator pointer 39 on the face of the non-magnetic housing corresponds to one revolution of the magnetic disc 37, since the pointer and disc are secured to the common shaft 40. The illustrated construction of the gauge shows the actuating members movable in a ratio of 1 to 1. Thus, as the float 21 rotates through preferably somewhat less than one revolution, in response to a rise or drop in liquid level within the gauge, magnetic discs 23 and 37 and indicator arrow 39 also rotate through preferably somewhat less than one revolution. It is primarily assembled in this manner for simplicity of design and operation. If, however, a different ratio between the action of the float 23 and the action of the pointer 39 is desired, mechanical means may be installed within the housing 38 or tube 11 between any driving member and corresponding driven member of the gauge assembly.

As previously mentioned, a particular advantage of this type of indicator is its adjustability. If, for example, the fluid tank is installed below the surface of the ground or below the level on which the observer stands the housing 38 may be moved so that the plane of rotation of the disc 37 is substantially in parallel relation with that of the disc 23. In this setting of the housing 38 indicated in dotted lines the disc 37 rotates with disc 23, the polarities thereof being oppositely disposed, as is well known, and the indicator 39 is initially adjusted to agree with the graduations on the face 41, for example, at "Empty," when no liquid is in the tube prior to installing the device in the tank. Thereafter, as the liquid rises in the tube, the indicator reads correctly. By virtue of the small separation between the "Full" and "Empty" positions and a corresponding slightly less than 360° of convolution of the spiral 32 the empty and full conditions are readily distinguishable. In this manner, the liquid level within the tank itself may be read from above the face 41 on which the liquid levels are graduated. The housing may be moved to other convenient positions for reading of the liquid level so long as the two discs are sufficiently close to each other to allow the coaction of their magnetic fields.

It is also contemplated that the present form of the invention may be coupled to a remote-indicating system such as a self-synchronous generator-motor hook-up, in order that the liquid level within the gauge may be recorded at a distant point. If so desired, the indicator pointer would be eliminated and a generator attached to the end of shaft 40. The generator in turn would be electrically connected to a motor which would follow the movement of magnetic disc 37.

The successful operation of this type of magnetic indicator depends, to a large degree, upon the strength of the magnetic fields. It is therefore intended that the magnetic members be composed of high-grade permanent magnetic material, preferably of a dispersion-hardening alloy, such as a composition of aluminum, nickel, cobalt and iron known commercially as "Alnico."

It will be obvious, of course, that the invention may be put into effect in different ways; that is, it is equally applicable to any form of tank, either portable or stationary. The preferred form of the invention, as illustrated by Figure 1, may be installed in either type of tank and is designed especially for a portable container so that a true indication of the liquid level may be recorded in spite of sudden movement of the liquid within the tank.

Figure 4:
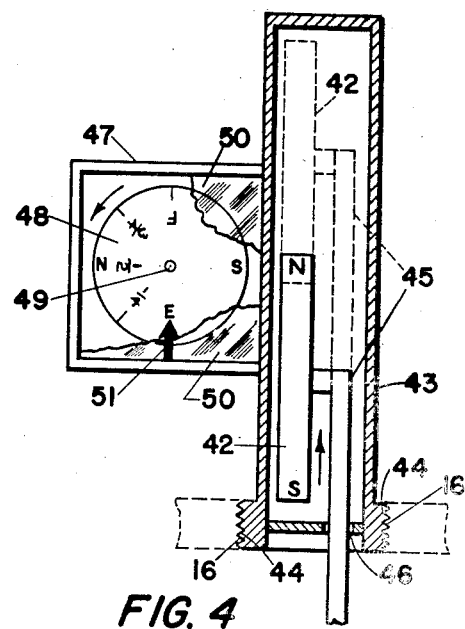
Figure 4 is a fragmentary sectional view of the alternate form of indicator mechanism showing the operative relation between the magnetic disc and the bar magnet.

An alternate and somewhat simpler form of the invention is specifically, although not exclusively, designed for the stationary type of tank and is illustrated by Figure 4 in which a permanent bar magnet 42 is substituted for the driving magnetic disc 23, as illustrated by Figure 1. It consists essentially of a housing 43, preferably cylindrical in shape, which may be fitted to any suitable tank. In this instance, threads 44 on the outer surface of the housing engage threads 16 of a wall in tank 17. The permanent magnet 42 is mounted at the upper extremity of a shaft 45 which is slidably mounted within the housing through the opening 46. The shaft 45 is actuated by suitable float means in order that changes of liquid level within the stationary tank may be recorded by a corresponding linear movement of the bar magnet.

A smaller housing 47 is mounted externally of the housing 43 and contains a rotative magnetic disc 48 similar to the discs 23 and 37 previously described. In this instance, however, the plane of rotation of the disc 48 is substantially parallel to the line of longitudinal movement of the bar magnet 42. The magnetic disc 48 is mounted within the housing 47 on shaft 49 so that observation of the disc may be along its axis of rotation. A transparent window 50 is mounted in one side of the housing in order that the indications, which are noted directly on the magnetic disc, may be seen. An arrow 51 is conveniently marked upon the window to facilitate the reading of the liquid level indications.

This form of the invention is somewhat limited, however, in that the disc in response to the movement of the magnet rotates effectively through only 180°. This does not prevent a true indication of the liquid level within the tank, but merely necessitates the mounting of the disc in a somewhat different manner than as indicated in Figure 1. It is apparent from the dotted lines in Figure 4 that as the permanent bar magnet rises longitudinally within the housing in response to liquid level changes, the indicator disc 48 rotates in a counter-clockwise direction. It is also necessary in this instance, as in Figure 1, that a portion of the housing wall be of non-magnetic material to prevent weakening of the field between the two magnetic members.

While a specific form of the invention has been described herein, the magnetic transmission is also intended for use as means generally for transmitting motion in devices where such a driving mechanism is applicable.

The invention described herein may be used by or for the Government of the United States for governmental purposes without the payment to me of any royalties thereon or therefor.

I claim:

1. In a liquid-level gauge having a float responsive to changes in liquid level, an indicator comprising a diametrically magnetized disc member mounted for horizontal rotation in response to vertical motion of said float, a magnetic disc diametrically magnetized and journal mounted for rotation about an axis perpendicular to the axis of said disc member and having said axis of said disc perpendicular to the lines of force from said disc member, whereby said disc rotates responsive to the movements of said disc member, and means connected to said magnetic disc to indicate the degree of rotation thereof.

2. In a fluid level indicator for a tank, the combination of, a vertical tubular member extending substantially the full depth of the tank, a pair of pivot bearings at the top and bottom, respectively, of said member, a vertical shaft rotatably supported in said pivots, a float member around said shaft and slidable therealong having rotation-producing key members adjacent the shaft, keying fins secured to the shaft and vertically arranged in cooperating relation to said key members for producing shaft rotation in response to float rotation, helical guide means concentric with the shaft constructed and arranged to rotate said float member substantially one turn as the float traverses the length of the tubular member, a disc magnet transversely magnetized and mounted on the upper end of the shaft for rotation in a horizontal plane immediately beneath the top of the tubular member, a second disc magnet transversely magnetized and mounted above the tubular member for rotation about a horizontal axis and having a peripheral edge thereof in close proximity to a peripheral edge of first said magnet regardless of the degree of rotation thereof, respectively, whereby said magnets are caused to rotate in unison through equal angles in response to float movement, and means for indicating the degree of rotation of second said magnet calibrated in relative fullness of the tank, said calibration being linear.

3. In the indicator of claim 2, said guide means limited to a helix of less than a complete revolution about said shaft, whereby said magnets rotate somewhat less than a full turn as the tank is filled, thereby to prevent ambiguity in indications of full and empty conditions of the tank.

4. A fluid level indicator for a tank comprising, a vertical shaft extending substantially the full depth of the tank and mounted for rotation about its vertical axis, a float member having a peripheral index, being concentric with said shaft and arranged in freely vertical sliding relation thereto, key means on said shaft and said float cooperating to produce coincident rotation of float and shaft, helical guide means concentric with the shaft and cooperating with said index to uniformly rotate the float as it rises and falls within the tank, a diametrically magnetized disc magnet secured for horizontal rotation to one end of said shaft adjacent a horizontal wall of the tank, a second and similar magnet journaled for free rotation in a mounting about a horizontal axis intersecting said vertical axis and arranged to have a peripheral edge in close coupling relation to a peripheral edge of first said magnet, second said magnet being external to the tank in visible position, and visible indicating means a first member arranged to rotate coincidently with the second magnet and a second member associated with said first member and calibrated in relative fullness of the tank.

5. The indicator of claim 4, wherein said second magnet mount is positionable for magnet rotation alternatively about said horizontal axis and for horizontal rotation parallel to first said magnet with axes thereof coincident, said positioning being accomplished by rotation of said mount about an axis perpendicular to the rotational axis of the second magnet.

6. The combination of claim 1 characterized further by a liquid retaining tubular member enclosing said float and disc member and separating said disc member from said magnetic disc, said liquid retaining member having an opening in its bottom portion providing a passageway for liquid flow into said tubular member, and staggered flow-retarding baffle plates adjacent said opening and within said tubular member.

7. The combination of claim 1 characterized further by a liquid retaining tubular member enclosing said float and disc member and separating said disc member from said magnetic disc, and air relief vents near the top of said liquid retaining member for preventing back pressure from influencing the buoyancy of said float.

ROBERT L. CROUSE.

REFERENCES CITED

The following references are of record in the file of this patent:

UNITED STATES PATENTS

| Number | Name | Date |
|---|---|---|
| 44,118 | Smith et al. | Sept. 6, 1864 |
| 885,675 | Martin | Apr. 21, 1908 |
| 1,253,324 | Windbridge | Jan. 15, 1918 |
| 1,960,324 | Van Deventer et al. | May 29, 1934 |
| 2,216,035 | Lang | Sept. 24, 1940 |
| 2,241,983 | Connolly | May 13, 1941 |

FOREIGN PATENTS

| Number | Country | Date |
|---|---|---|
| 574,241 | France | Mar. 27, 1924 |